United States Patent [19]

Stauffer

[11] Patent Number: 4,752,799
[45] Date of Patent: Jun. 21, 1988

[54] OPTICAL PROXIMITY SENSING OPTICS

[75] Inventor: Norman L. Stauffer, Englewood, Colo.

[73] Assignee: Honeywell Inc., Minneapolis, Minn.

[21] Appl. No.: 21,934

[22] Filed: Mar. 5, 1987

Related U.S. Application Data

[63] Continuation-in-part of Ser. No. 883,289, Jul. 7, 1986, which is a continuation-in-part of Ser. No. 767,949, Aug. 21, 1985.

[51] Int. Cl.$^4$ .............................................. G03B 3/00
[52] U.S. Cl. ....................................... 354/403; 356/1; 356/4
[58] Field of Search .................... 354/403; 356/1, 4

[56] References Cited

U.S. PATENT DOCUMENTS 2,651,771 9/1953 Palmer .
3,937,574 2/1976 Peckham et al. ...................... 356/4
4,065,778 12/1977 Harvey .
4,473,285 9/1984 Winter .
4,479,706 10/1984 Takahashi .

OTHER PUBLICATIONS

"Total Sensory System for Robot Control and its Design Approach", Masuda et al., 77th ISIR 7587 Japan.

Primary Examiner—Russell E. Adams
Attorney, Agent, or Firm—Charles J. Ungemach

[57] ABSTRACT

A device for measuring the distance to a surface comprising first and second energy emitting sources positioned at two different distances with respect to the surface and driven by a signal which is of common frequency, but which is of different phase from one another. The beams produced by the two energy sources are reflected from the surface and the resultant vector sum of the beams received by an energy responsive detector is used to produce a resultant signal which has a phase that varies with the distance to the remote surface.

58 Claims, 5 Drawing Sheets

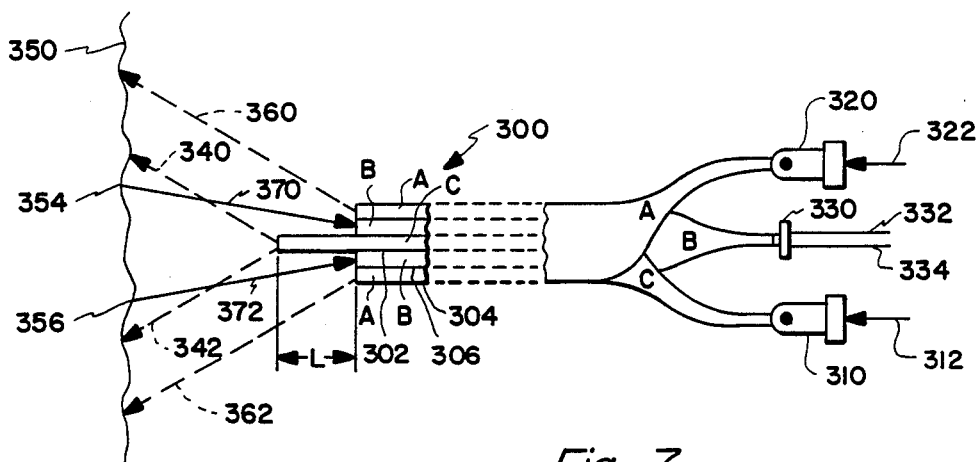
Fig. 7
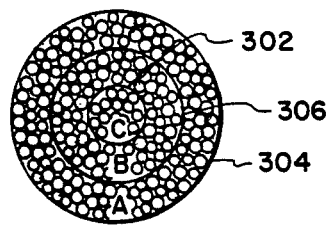
Fig. 8
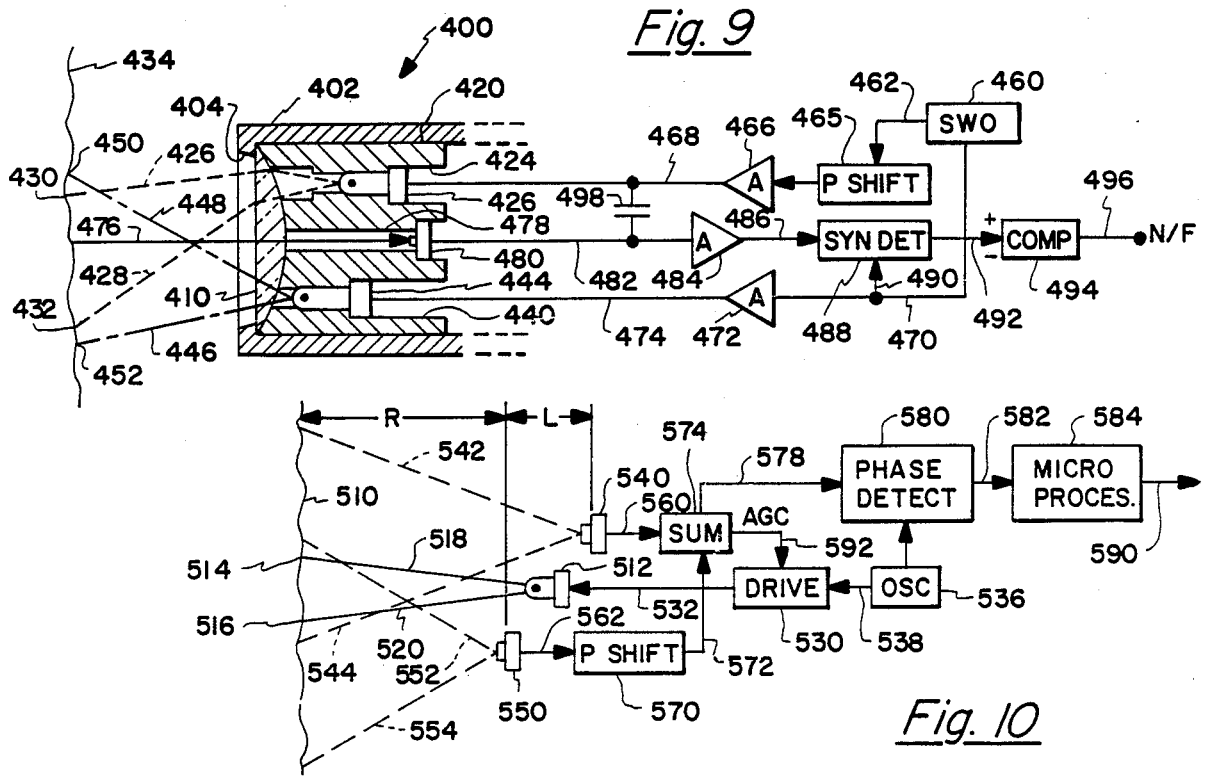
Fig. 9
Fig. 10

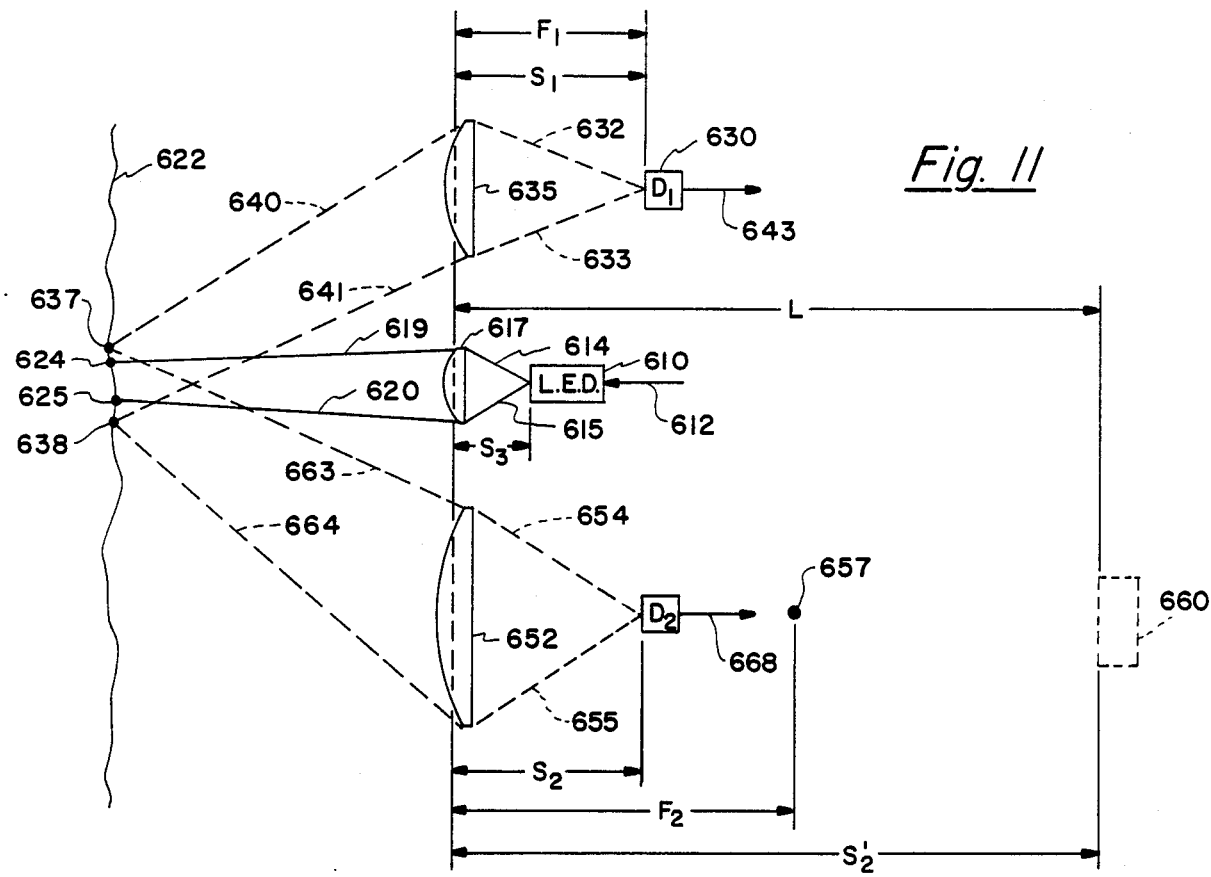
Fig. 11
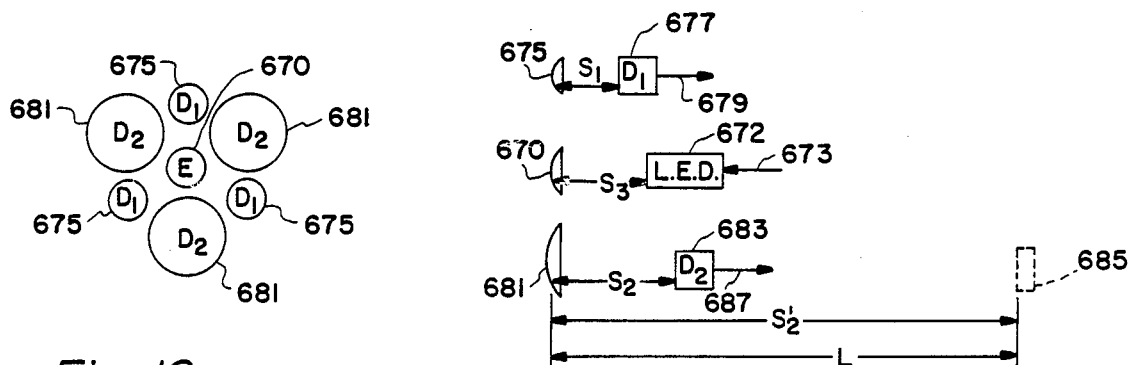
Fig. 12
Fig. 13

OPTICAL PROXIMITY SENSING OPTICS

This application is a continuation-in-part of application Ser. No. 883,289, filed July 7, 1986, which is a continuation in part of Ser. No. 767,949, filed on Aug. 21, 1985.

BACKGROUND OF THE INVENTION

It is often desirable to be able to determine the distance to a surface or object without actually touching the surface or object itself. In the field of process controls, for example, it may be desirable to determine the placement of machine parts, materials, sheets, or irregularly shaped objects without using tape measures, rules, or other normal contact like devices. In the field of photography it is desirable to be able to automatically focus the camera on objects at a remote distance from the camera.

Many optical devices have been devised in the prior art for determining the distance to such remote objects, most of which have been based upon the principle of triangulation wherein light reflected from the object travels over two separate paths so as to be received upon spaced apart detectors and the images they produce compared to determine the distance to the remote object. In other devices a beam of energy is transmitted to the object and the return energy is either measured for the angle in which the reflection occurred or the time elapsed from the sending to receiving of the energy. In my application Ser. No. 675,665, filed Nov. 28, 1984 and assigned to the assignee of the present invention, I disclose a surface position sensor in which a beam of energy is reflected from a surface and passed through an aperture so as to be received along the length of the detector at a position corresponding to the surface position. Other examples of surface position sensors and similar apparatus in the prior art may be seen in the Winslow Palmer U.S. Pat. No. 2,651,771 issued Sept. 8, 1953, the Donald Harvey U.S. Pat. No. 4,065,778 issued Dec. 27, 1977, the Akira Takahashi U.S. Pat. No. 4,479,706 issued Oct. 30, 1984, and the Arthur Winter U.S. Pat. No. 4,473,285 issued Sept. 25, 1984.

One major difficulty with triangulation type systems is that they must have very tight mechanical tolerances which makes them more costly to build and require more care in handling and use than may be desired. The systems which time a beam from transmission to reception are very costly, extremely complex and usually quite large. Ultrasonic types have the additional problem of being subject to interference in factory conditions and being quite bulky.

SUMMARY OF THE INVENTION

The present invention overcomes these problems and produces a compact, simple, accurate, and inexpensive position sensing device, and in doing so does not utilize the triangulation or timing techniques of the prior art. In the present invention, two sources of energy are positioned to be at different distances from the remote surface to be ranged. The energy sources may be infrared or visible energy and are modulated at the same frequency but with one of the sources phase shifted with respect to the other. The energy from the two sources illuminates a portion of the remote surface and some of the energy is reflected. A detector sensitive to the energy is positioned to receive the reflection of both beams from the surface so as to produce an output which is, in effect, the vector sum of the two reflections. Rather than measure the magnitude of the resultant vector, which depends on the surface reflectivity that may not be known or may vary, I have discovered that the phase angle of the vector sum reflected is related to the range and is not dependent on surface reflectivity. Accordingly by detecting this phase angle the present invention is able to produce an output indicative of the desired range.

BRIEF DESCRIPTION OF THE DRAWINGS

FIG. 7 shows an alternate embodiment for the transmitting and receiving elements in the form of a fiber optic probe;

FIG. 8 is an enlarged cross-section view of the probe of FIG. 7;

FIG. 9 is an embodiment of the invention for use as a switching proximity sensor;

FIG. 10 is a schematic diagram of another preferred embodiment of the present invention;

FIG. 11 shows a further alternate embodiment of the present invention in which optical distances are substituted for actual distances;

FIG. 12 shows a detector arrangement;

FIG. 13 shows a side view of FIG. 12;

DETAILED DESCRIPTION OF THE PREFERRED EMBODIMENTS

Figure 1:
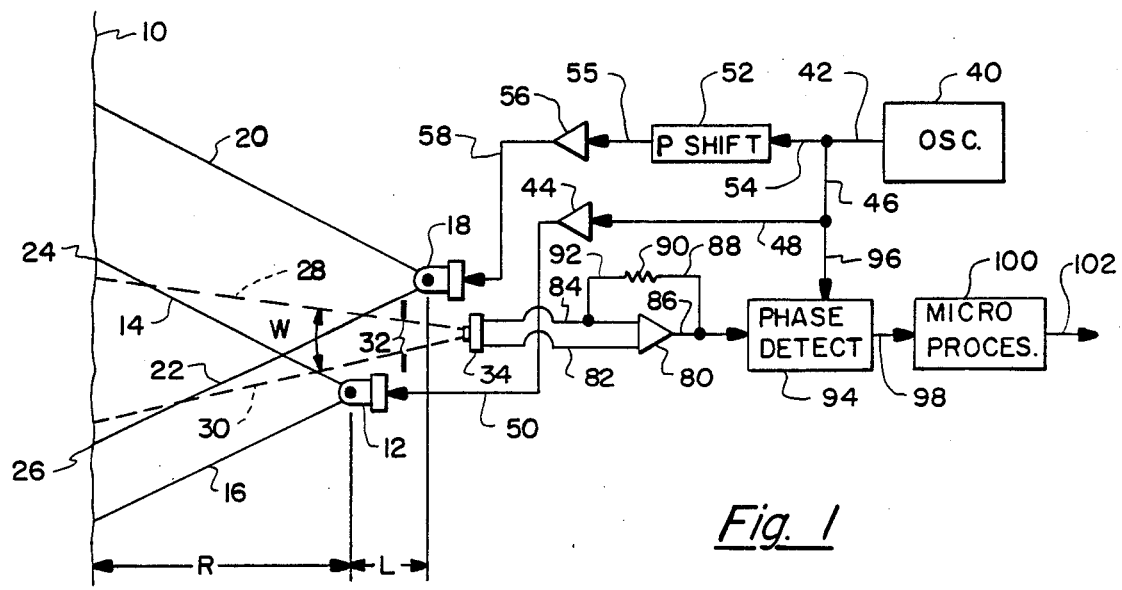
FIG. 1 shows a schematic diagram of a preferred embodiment of the present invention.

In FIG. 1, a surface 10 is shown the distance to which is to be measured. Surface 10 is shown as at least partly diffuse so that energy reflected therefrom comes off at various angles.

A first energy projecting device 12 which, in the preferred embodiment, is an infrared emitting LED, is shown located at the unknown distance R from the surface 10 and projects a beam of infrared energy over paths such as shown by lines 14 and 16 to the surface 10. A second energy projecting device 18 which is also, in the preferred embodiment, an infrared emitting LED, is shown located more remote from surface 10 than LED 12 by a predetermined distance L. The distance L may be an actual displacement, as shown, or may be an equivalent optical distance controlled by lenses of appropriate focal length placed in the radiation paths of the LED's in which event, the value of "L" may be controlled to any value, including zero. This may be desirable where the space available for the system is limited.

In FIG. 1, LED 18 is shown above and behind LED 12 so as to send a second beam of infrared energy along paths such as shown by lines 20 and 22 to the surface 10. The beams of energy from LEDs 12 and 18 are shown to overlap on the surface 10 in the area between points 24 and 26 which, of course, also extends into and out of the plane of FIG. 1. Energy from this area is reflected off the surface 10 along paths such as shown by dashed lines 28 and 30 through an aperture shown by reference numeral 32 to an energy responsive detector 34 which, in the preferred embodiment, is a photo diode preferably a silicon photo detector which is responsive to infrared energy.

An oscillator 40 is shown in FIG. 1 operable to produce an output on a line 42 which is of predetermined frequency and which is in turn presented to a driver amplifier 44 through lines 46 and 48. The output of amplifier 44 is presented over a line 50 to drive LED 12 at a first frequency and phase. The signal on line 42 is also presented to a phase shifter 52 via line 54 so that the signal from oscillator 40 is shifted by a predetermined amount. This phase shifted signal is present via line 55 to a second driver amplifier 56 which in turn presents the phase shifted signal along a line 58 to drive LED 18 at the first frequency but at a second phase. Thus, it is seen that LED 12 and LED 18 are both driven at the frequency of oscillator 40, but the phase of the energy produced by LED 18 is shifted with respect to the phase of the energy produced by LED 12. It should be understood that the amount of phase shift is not particularly critical to the present invention (although, with larger phase shifts, i.e. 120 degrees to 180 degrees, the sensitivity to range changes tends to increase), nor is the frequency of oscillator 40 or the distance L, these values being chosen by those skilled in the art for best performance. In one experiment, the frequency was chosen to be 10 KHz, L was 40 mm and the phase shift was a large angle between 120 degrees and 180 degrees.

The reflected energy from the area between points 24 and 26 and detected by detector 34 will be a vector summation of the fluxes produced by the LEDs 12 and 18. More particularly, if $I_1$ is the radiant intensity of LED 12, then the flux density $E_1$ from LED 12 is:

$$E_1 = \frac{I_1}{R^2} \quad (1)$$

Similarly, if $I_2$ is the radiant intensity of LED 18, then the flux density $E_2$ form LED 18 becomes:

$$E_2 = \frac{I_2}{(R + L)^2} \quad (2)$$

If detector 34 has an area Q and if the aperture 32 is such that the detector subtends an angle W, then the flux $F_1$ received by the detector from LED 12 is:

$$F_1 = E_1 \times \frac{KWQ}{\pi} \quad (3)$$

Where K is the fraction of radiation reflected from the surface 10.
Substituting equation 1:

$$F_1 = \frac{I_1}{R^2} \times \frac{KWQ}{\pi} \quad (4)$$

Likewise, the flux $F_2$ received by detector 34 from LED 18 is:

$$F_2 = E_2 \times \frac{KWQ}{\pi} \quad (5)$$

Substituting equation 2:

$$F_2 = \frac{I_2}{(R + L)^2} \times \frac{KWQ}{\pi} \quad (6)$$

It is seen from equations 4 and 6 that the flux received by the detector is related to the distance, R, to the remote surface and if the factor K were constant, the measurement of $F_1$ or $F_2$ would produce an indication of the unknown distance R. K is, however, dependent upon the quality of the surface 10 and is not constant. Accordingly, measurement of the fluxes $F_1$ and $F_2$ will only be acceptable if K can be made to drop out. For example, if the ratio of $F_1$ and $F_2$ is taken, K and also WQ and $\pi$ drop out by the cancellation effects of division. Accordingly, I can obtain an output indicative of the distance R by measuring a ratio of $F_1$ and $F_2$. In a preferred embodiment I obtain an expression which involves this ratio by measuring the phase of the signal received by detector 34.

Figure 2:
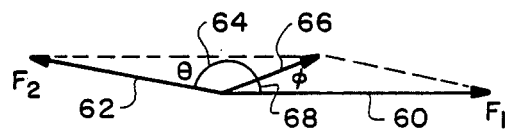
FIG. 2 shows a vector diagram of the fluxes produced by the energy sources of FIG. 1.

Since the LEDs are modulated by the same frequency but the phase of one is shifted with respect to the other by an amount $\phi$ which, as described above in a preferred embodiment is a fairly large angle, then the total flux received by detector 34 is the vector sum of $F_1$ and $F_2$ as is shown, for example, in FIG. 2 of the drawings. In FIG. 2, the flux received by detector 34 from LED 12 is shown as an arrow 60 extending to the right and labelled $F_1$. The flux received by detector 34 from LED 18 is shown in FIG. 2 as an arrow 62 extending to the left at a large angle $\theta$ labelled 64 about 170 degrees from arrow 60 and labelled $F_2$.

The resultant vector is shown by an arrow 66 in FIG. 2 and this lies at an angle 68 labelled $\phi$ in FIG. 2. This resultant vector 66 will be the magnitude and phase of the signal produced by detector 34 when it is set to view the area between points 24 and 26 on surface 10 and, as will be explained, measurement of angle $\phi$ produces an indication of the distance R as desired. More particularly, from FIG. 2 it can be shown that the tangent of phase angle $\phi$ for the resultant flux vector 66 is:

$$\frac{\sin \theta}{\frac{F_1}{F_2} + \cos \theta} \quad (7)$$

and because the denominator involves the ratio $F_1/F_2$, the undesirable variable K as well as the constants W, Q and $\pi$ drop out. By substitution of equations 4 and 6 into equation 7, the phase angle $\phi$ can be expressed as:

$$\phi = \tan^{-1} \left[ \frac{\sin \theta}{\frac{I_1}{I_2} \times \frac{(R + L)^2}{R^2} + \cos \theta} \right] \quad (8)$$

It is seen from equation 8 that the factors KWQ and have all dropped out leaving the phase angle $\phi$ related only to the ratio of the radiant intensities of the LEDs, the sin and cosin of the known phase shift, the known distance L, and the unknown distance R. Thus, $\phi$ will vary with R in a somewhat non-linear fashion as is best seen in FIG. 3.

Of course, other ways of dividing or ratioing the fluxes $F_1$ and $F_2$ to eliminate the factors K, W, Q, and $\pi$ will occur to those skilled in the art. For example, while I have shown both LEDs 12 and 18 operating simultaneously, they can be operated by switches in series so that the surface 10 is first illuminated by LED 12 and then by LED 18. In this event, the output of detector 34 could be presented to a sample-and-hold circuit (not shown) which would hold one signal until it received the next and then compare them in a manner similar to that described. The vector resultant would not appear at any one time at the output of the detector 34 but would be derived by downstream apparatus which would take the ratio of the series signals from the detector.

Figure 3:
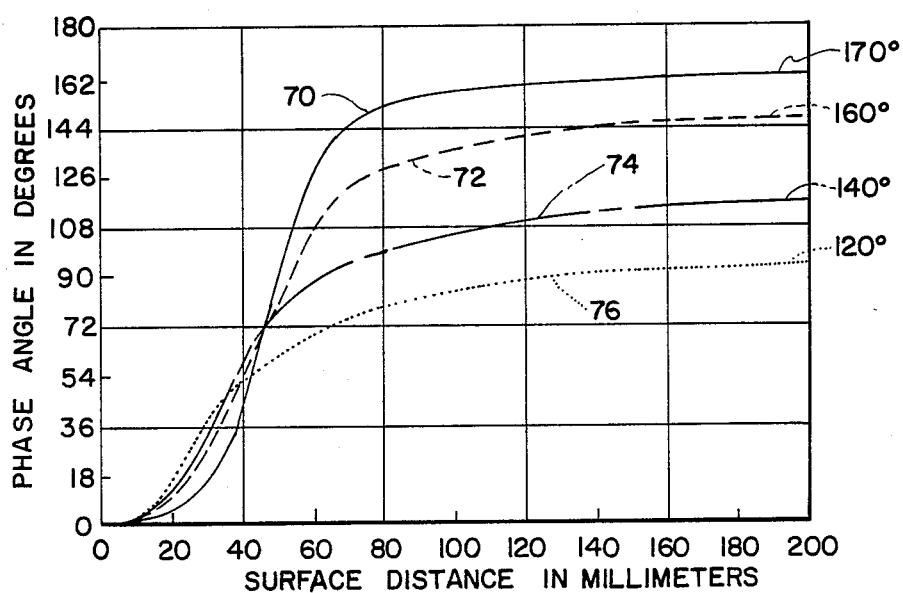
FIG. 3 is a graph showing the variation of phase angle of the resultant energy in degrees with the surface distance in millimeters.

In FIG. 3, a graph showing different phase angles for the resultant vector 66 of FIG. 2 compared with the distance R to the surface 10 with various amounts of phase shift is depicted. In FIG. 3, $I_1/I_2$ is 0.3 and L is 40 millimeters. The solid line shown by reference numeral 70 represents the curve when the phase shift is 170 degrees. The dashed line 72 shows the variation when the phase shift is 160 degrees, the solid-dash line 74 shows the variation when the phase shift is 140 degrees, and dotted line 76 shows the variation when the phase shift is 120 degrees. The preferred embodiment uses a large phase shift since the curve, at the upper end of the measurement, has the greatest variation. Other factors involved, however, are the distance L and the radiant intensities of LEDs 12 and 18. Accordingly, it will be best to choose the desired values in accordance with the desired output for a particular use.

While FIG. 3 shows variations only between 0 and 200 millimeters for the distance R, it should be understood that the variation can be extended much further and surfaces up to a number of yards from the detectors can be measured with a fair degree of accuracy. Furthermore, when used for camera autofocus, it has been found that a curve such as solid line 70 fairly closely approximates the curve that is found when lens motion is plotted against distance to remote object. In other words, the lens moves in the camera by a non-linear amount which, at the larger distances approaches a flat curve since camera focus beyond several yards is substantially at infinity. Because of this approximation, by properly choosing the phase shift, a direct drive between the distance measuring circuit as shown in FIG. 1 and the camera lens can be produced. It would not then be necessary to provide any characterized means to adjust the amount of camera lens motion for changes in distance since the output of the device of FIG. 1 would approximate this without characterization.

I have also found that if the phase shift is made 180 degrees, then the curve of FIG. 3 approaches a verticle line at a surface distance which depends upon the ratio $I_1/I_2$ and L. This feature would find use in rapidly indicating whether a surface were closer or further than a predetermined amount or, for example, on automobiles, to sound an alarm when an object was closer than a preset minimum such a circuit will be described in connection with FIG. 9.

Returning to FIG. 1, the output of detector 34 which is indicative of the resultant flux vector 66 of FIG. 2, is presented to an amplifier 80 by two conductors 82 and 84. The output of amplifier 80 is connected to the negative input thereof by conductor 86, a conductor 88, a resistor 90, and a conductor 92 for a feedback loop such as is commonly used for an operational amplifier. Conductor 86 is also connected to a phase detector 94 which receives a reference input from oscillator 40 via conductors 42, 46, and a conductor 96. Phase detector 94 operates to determine the phase angle $\phi$ of FIG. 2 in order to produce an output representative of the function of equation 8 above. This output is seen on a conductor 98 which is presented to a microprocessor 100 for purposes of solving equation 8 and producing an output on a conductor 102 representative of the unknown distance R as desired. Of course, where the apparatus is driving a camera lens, the microprocessor 100 may not be necessary since, as explained above, the output from the phase detector following the non-linear curve for example 70 in FIG. 3 may be sufficient to directly drive the camera lens. Many autofocus circuits already employ a microprocessor, however, and the output from phase detector 94 can therefore readily be used with that microprocessor to produce the autofocus signal. Likewise, when the phase shift is 180 degrees, the output from phase detector 94 will be abrupt and a micro processor would not be required. In industrial process applications, the output 102 may be used to control the position of a robot arm or other device necessary to perform a desired function on the surface 10 or just to make sure it is within the proper range of distances for assembly line work.

In the above-described apparatus, it is seen that a very accurate measurement of the distance to a remote surface can be made with inexpensive and easily available components connected in a simple and straight forward manner without need for close mechanical tolerances and which will not be bulky or costly. These desirable effects are produced by the measuring of the phase angle of the resultant flux vector. It should be understood that other techniques to take the ratio of $F_1$ and $F_2$ or other ways to produce a resultant flux vector may be devised by those skilled in the art, as for example, the schematic diagram of an alternate embodiment shown in FIG. 4.

Figure 4:
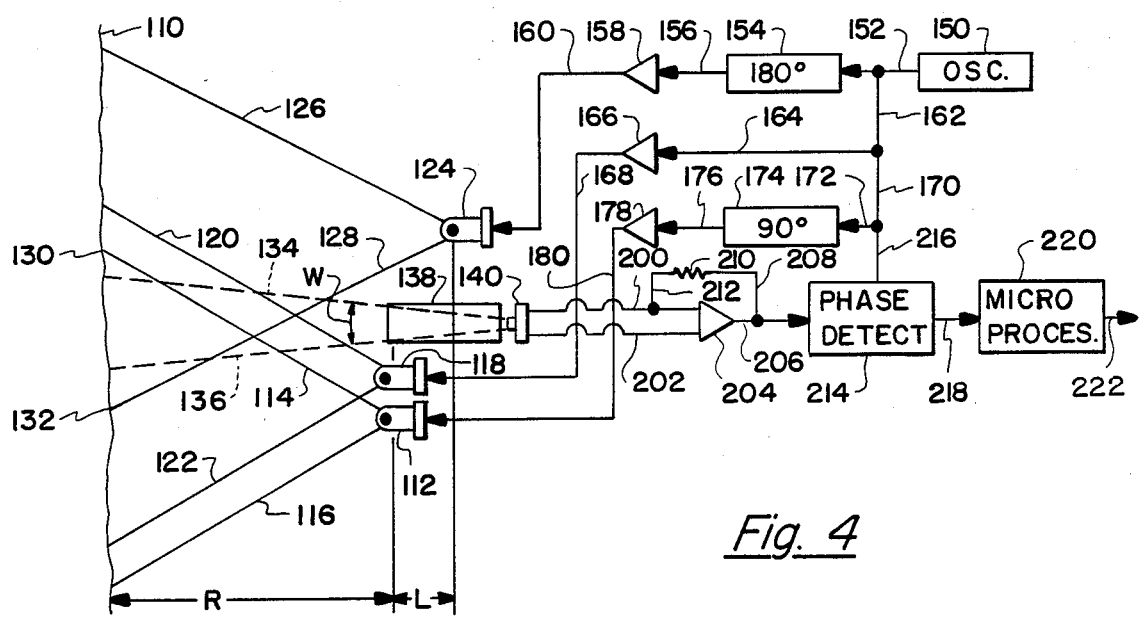
FIG. 4 is a schematic diagram of an alternate embodiment of the present invention.

In FIG. 4, a diffuse surface 110 is shown to which the unknown distance R is to be measured. A first source of energy 112 which, like in FIG. 1, may be an infrared LED is shown projecting a beam of energy along paths such as 114 and 116 to the surface 110. A second energy source 118 is shown sending its beam along paths such as 120 and 122 to the surface 110. A third energy source 124, which may also be an infrared LED is shown sending its beam along paths such as 126 and 128 to the surface 110. As seen in FIG. 3, LEDs 112 and 118 are located the unknown distance R from surface 10 whereas the third LED 124 is located more remotely than the other two LEDs by a known distance L. Of course, as previously stated, the distance L need not be an actual physical distance but may be an optical distance created by lenses in the energy path. As with FIG. 1, the three LEDs project their energy onto the wall in such a way that there is an area between points 130 and 132 that overlap.

Energy from surface 110 is reflected back along paths such as shown by dashed lines 134 and 136 through an aperture shown as a tubular member 138 to a detector 140 sensitive to the radiation emitted by the LEDs. As with FIG. 1, detector 140 may be a photo diode such as a silicon photo detector sensitive to infrared energy. As with FIG. 1, tubular member 138 acting as an aperture restricts the reflected energy to a solid angle W and detector 140 will have a detection area Q.

An oscillator 150 in FIG. 3 produces a signal of predetermined frequency on a line 152 which is presented first to a 180 degrees phase shifter 154 whose output on line 156 is presented to a driver amplifier 158 so as to produce a driving signal on line 160 to the LED 124 at the fixed frequency but at a phase shifted 180 degrees with respect to the output of oscillator 150. The output of oscillator 150 on line 152 is also presented by way of a line 162 and a line 164 to a second driver amplifier 166 whose output is connected by way of a line 168 to the input of LED 118. Accordingly, LED 118 is driven by a signal which is at the same frequency and phase as the output of oscillator 150. A third path for the output of oscillator 150 is via line 152, line 162, a line 170, and a line 172 to a second phase shifting device 174 which shifts the phase of the signal from oscillator 150 by 90 degrees. The output of phase shifter 174 on a line 176 is present to a third driver amplifier 178 whose output on a line 180 drives LED 112. The input to LED 112 is therefore of the same frequency as the oscillator 150 but with a phase which has been shifted 90 degrees with respect thereto.

Figure 5:
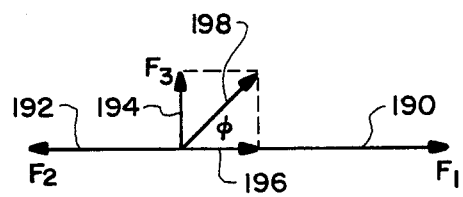
FIG. 5 is a vector diagram of the fluxes produced by the energy sources of FIG. 4.

The area between points 130 and 132 on surface 110 which receive beams from all three LEDs, as was the case in FIG. 1, reflects energy, the vector sum of which is detected by detector 140. If the signal from LED 118 which is in phase with the oscillator output 150 is $F_1$, this vector is shown in FIG. 5 as an arrow 190 extending to the right. The signal from LED 124 which is 180 degrees out of phase with oscillator 150 is the signal $F_2$ seen in FIG. 5 as an arrow 192 extending to the left and 180 degrees out of phase with the arrow 190. The flux from LED 112, $F_3$, is shown in FIG. 5 as an arrow 194 extending upwardly and 90 degrees out of phase with respect to arrow 190. In FIG. 5, the difference between flux $F_1$ and $F_2$ is shown as an arrow 196 extending to the right in phase with the arrow 190. The resultant vector shown as arrow 198 is the diagonal constructed between arrow 196 and 194 and represents the resultant flux from the three sources of energy, LEDs 112, 118, and 124.

The phase angle $\phi$ between the resultant vector 198 and flux vector 190 is measured and, as will be shown, is representative of the distance R. More particularly, with the solid angle W subtended by the detector 140 having an area Q and with the intensity of radiation $I_1$ from LED 118, the flux density $E_1$ therefrom is given by the equation:

$$E_1 = \frac{I_1}{R^2} \quad (9)$$

Similarly, with $I_2$ the radiant intensity of LED 124, then the flux density $E_2$ therefrom is given by the equation:

$$E_2 = \frac{I_2}{(R+L)^2} \quad (10)$$

Likewise, with $I_3$ the radiant intensity of LED 112, then the flux density $E_3$ therefrom is given by the equation:

$$E_3 = \frac{I_3}{R^2} \quad (11)$$

As with the analysis of FIG. 1, the reflected flux from the output of LED 118 will be given by the equation:

$$F_1 = E_1 \times \frac{KWQ}{\pi} = \frac{I_1}{R^2} \times \frac{KWQ}{\pi} \quad (12)$$

Similarly, the flux reflected from surface 10 that originated at LED 124 will be given by the equation:

$$F_2 = E_2 \times \frac{KWQ}{\pi} = \frac{I_2}{(R+L)^2} \times \frac{KWQ}{\pi} \quad (13)$$

and the flux reflected from surface 110 originating at LED 112 will be given by:

$$F_3 = E_2 \times \frac{KWQ}{\pi} = \frac{I_3}{R^2} \times \frac{KWQ}{\pi} \quad (14)$$

From FIG. 5, the resultant flux given by arrow 198 can be shown to be given by the equation:

$$\phi = \tan^{-1}\left[\frac{\frac{I_3}{R^2}}{\frac{I_1}{R^2} - \frac{I_2}{(R+L)^2}}\right] \quad (15)$$

It is thus seen again that $\phi$ will be related to R since K, W, Q and $\pi$ have cancelled out and R is the only variable in the equation through a non-linear relationship similar to that seen in FIG. 3.

Returning again to FIG. 4, the resultant flux received by detector 140 produces an output signal on lines 200 and 202 to an amplifier 204 having an output on line 206. The output 206 is connected by a line 208, a resistor 210 and a line 212 back to the negative input of amplifier 204 for a feedback circuit characteristic of operational amplifiers. The output line 206 is also connected to a phase detector 214 which has a reference signal from oscillator 150 presented thereto via lines 152, 162, 170, and a line 216. Phase detector 214 produces an output which is related to the angle $\phi$ and thus to the unknown distance R which appears on output line 218 presented to a microprocessor 220 which produces an output to any suitable utilization apparatus on a line 222. As mentioned before, it is possible to simulate the general curve structure for the camera lens motion with respect to distance and thus with camera autofocus system, microprocessor 220 may not be necessary. Since many cameras already have a microprocessor, however, it may be desirable to utilize the output from the phase detector through the microprocessor to position the camera lens.

Figure 6:
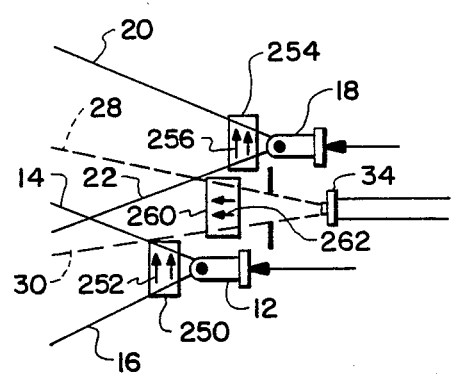
FIG. 6 shows a device for correcting a problem that may arise with highly specular surfaces.

When the surface such as 10 or 110 is highly specular, the return signal will appear to have originated from a source which is twice the distance from the detector as the surface 10 or 110 is. With respect to the specularly reflected energy the phase of the resultant vector would be given by the equation:

$$\phi = \tan^{-1}\left[\frac{\sin\theta}{\frac{I_1}{I_2} \times \frac{(2R+L)^2}{4R^2} + \cos\theta}\right] \quad (16)$$

and the system would work perfectly well on specular surfaces with this new equation. Where, however, the surface to be measured is a mixture of specular and diffuse then some arrangement for removing the specular reflection may be desirable. FIG. 6 shows the detectors of FIG. 1 with a correction apparatus for removing the specular part of a mixed signal. In FIG. 6, the LED 12 is shown presenting its beam along paths such as lines 14 and 16 through a polarizer 250 which polarizes the energy from LED 12 in a first direction shown by arrows 252. In similar fashion, the energy from LED 18 presents its beam along paths such as lines 20 and 22 through a second polarizer 254, which polarizes in the same direction as polarizer 250 as shown by arrows 256. Alternately, polarizers 250 and 254 may be 180 degrees opposite.

The detector 34 receiving reflected energy along paths such as shown by dashed line 28 and 30 receives them through an analyzer 260 which is polarized 90 degrees with respect to the directions of polarization of polarizers 250 and 254 as shown by arrows 262. The effect of analyzer 262 then is to remove the polarized light that is coming from LEDs 12 and 18, as would be the case with a specular surface, but not to remove the diffuse light coming off of the surface, which is not polarized. Accordingly, the reception by the detector 34, although perhaps of lesser magnitude than was the case in connection with FIG. 1, will still be only that portion of the signal which is diffuse in nature and accordingly will be analyzed by the system of FIG. 1 in the same manner as previously described.

The present invention also can be utilized to improve the operation of apparatus presently available in the prior art. For example, a fiber optic sensor manufactured by Mechanical Technology Incorporated and identified as the MTI 1000 transmits light through a fiber optic probe to a target surface and light reflected from the target back through the probe is converted into an electrical signal proportional to the distance between the probe face and the target by measuring the amount of flux returned from the surface. Less flux indicates larger distances while larger flux indicates smaller distances. The difficulty with the unit is that it must be calibrated for each surface that it encounters. The present invention is not so sensitive to the quality of the surface and need not be calibrated with each new surface it encounters. Accordingly, in FIGS. 7 and 8 I show a fiber optic probe 300 for use in applications like the MTI 1000. Probe 300 comprises three concentric layers of fiber optic elements with the center layer 302 and an outer layer 304 operating as radiation emitters and the middle layer 306 operating as the detector. The radiation emitting layers 302 and 304 should have a relatively high numerical aperature (NA) so that energy is transmitted to the surface in a relatively wide beam thus allowing both emitting elements to illuminate a predetermined area on the remote surface. The energy receiving layer 306 should have a relatively low NA so that energy is received in a more narrow beam from that predetermined area of the surface. The inner layer or core 302 is labelled "C" and is surrounded by a concentric middle layer 306 which is labelled "B" and which, in turn, is surrounded by the concentric outer layer 304 which is labelled "A". The three layers each comprise a bundle of small individual fiber optic elements to form a cylindrical probe. As seen in FIG. 7, the inner or core layer 302, labelled C, is bundled at the right end so as to receive energy from a first light emitting diode 310 which is energized from an input shown by arrow 312 to produce radiation, visible or preferably infrared, throughout the bundle of fiber elements in inner or core layer 302. In similar fashion the outer layer 304, labelled A, is bundled at the right end so as to receive energy from a second light emitting diode 320 which is energized from an input shown by arrow 322 to produce radiation along the outer layer of fiber optic elements 304. The middle layer 306, labelled B, is shown bundled at the right end to be adjacent to a radiation detector 330 which receives radiation from middle layer 306 to produce an output on lines 332 and 334 for use by the electronics such as is shown in connection with FIG. 1. It is noted that the inner layer 302 extends beyond the outer layer 304 by a distance L in FIG. 7 which corresponds to the distance L described in connection with FIG. 1 so that the same operation as was explained in connection with FIG. 1 takes place. More particularly, LED 310 and LED 320 will transmit light at the same frequency but phase shifted preferably by a rather large angle so that the light emitted from the inner layer 302 traveling along lines such as shown by dash lines 340 and 342 will illuminate a region of the remote surface 350 between points 354 and 356. Similarly, light from the outer layer 304 traveling lines such as shown by dash lines 360 and 362 will also illuminate the area between points 354 and 356. Light reflected back from this area along lines such as shown as solid lines 370 and 372 will be received by the middle layer 306 and transmitted to the detector 330 as seen in FIG. 7. The signals on lines 332 and 334 will be processed by circuitry such as that shown in FIG. 1 to provide an output indicative of the distance to the surface 350. Note that the angle between dashed lines 340 and 342 and the angle between dashed lines 360 and 362 is larger than the angle between solid lines 370 and 372. This is due to the higher NA of layers 302 and 304 than layer 306.

FIG. 9 shows an embodiment of the present invention for use as a switching proximity sensor for an application where it is desired to know when a surface being examined is at a predetermined distance or when it is either too near or too far. In FIG. 9 a probe 400 is shown having a casing 402 with an aperture 404 at the left end thereof. A lens 410 is shown mounted at the interior left end of the housing 402. A mounting member 420 is shown within the housing 402 and having a first bore hole 424 through the upper portion thereof and into which a first energy transmitter such as an IR producing LED 426 is mounted. Energy from the LED 426 passes through the remaining portion of the bore hole 424 and thence through the lens 410 and aperture 404 along lines such as shown by dash lines 426 and 428 to illuminate an area between points 430 and 432 on a remote surface 434. A second bore hole 440 located in the lower portion of mounting member 420 has a second energy emitter such as light emitting diode 444 mounted therein. LED 444 transmits energy along paths such as shown as dash-dot lines 446 and 448 to illuminate the surface 434 between points 450 and 452. As with the prior embodiments, the light emitting diodes 426 and 444 are at slightly different distances from the remote surface 434 for the same reasons as explained in connection with the other figures. A square wave oscillator 460 is shown having a first output on a line 462 to a phase shifter 465 which energizes an amplifier 466 to produce a square wave signal on a line 468 to energize the light emitting diode 426. The square wave oscillator 460 also produces an output on a line 470 to energize an amplifier 472 which produces a square wave output on a line 474 to energize the light emitting diode 444. The phase shifter 465 causes the signal from light emitting diode 426 to be phase shifted with respect to the signal from light emitting diode 444 by, in this case preferably, 180 degrees. Thus the central portion of surface 434 will be illuminated by energy from both diodes 426 and 444 but of opposite phase. The reflected energy will pass along a line such as shown by solid arrow 476 through a central bore hole 478 to a detector 480 which is mounted at the right end of central bore hole 478. Detector 480 will receive the energy from the two light emitting diodes 426 and 444 as reflected from surface 434 and will produce a resultant signal of the first phase or of the 180 degree shifted phase at an output connection 482. This signal is presented to an amplifier 484 whose output on line 486 is connected to a phase detector such as a synchronous detector 488. Phase detector 488 also receives a reference phase signal from the square wave oscillator 460 via lines 470 and a line 490. The output of the phase detector 488 appears on a line 492 and is either 0 showing that the surface is at a desired location or is of a plus characteristic when the resultant signal is of the first phase showing that the surface is closer than the desired position or is of a minus characteristic when the resultant signal is of the 180° shifted phase showing that the surface is more remote than the desired location. This plus, zero, or minus signal is presented to a comparator 494 which produces an output on a line 496 to indicate when the surface is "near" or "far". A small capacitor 498 may be connected between the output of amplifier 466 and the input of amplifier 484 to supply a small signal of the 180° shifted phase to cause a "far" indication when no surface 434 is visible within the range of the device.

FIG. 10 shows an alternate embodiment of the present invention wherein the system is substantially reversed from that shown by FIG. 1. More particularly, where FIG. 1 utilized two radiation emitters and one radiation detector, FIG. 10 utilizes one radiation emitter and two radiation detectors but, as will be shown, the basic principle involved is substantially the same.

In FIG. 10 the remote object 510 shown a distance R away from the system as was the case in connection with FIG. 1. A radiation source such as an LED 512 is shown illuminating an area between points 514 and 516 of object 10 by radiation being emitted along solid lines 518 and 520. LED is, as before, preferably an infrared radiation emitting diode and is energized from a drive circuit 530 by a connection shown as arrow 532. Drive circuit 530 is connected to an oscillator 536 by means of a connection shown as arrow 538. Drive circuit 530 is operable to change the gain of the signal being supplied to LED 512 and was not utilized in connection with FIG. 1 since changing the gain of two light emitting diodes could very well have introduced errors by changing the intensity of one of the LEDs more than the other. However, with the use of only one LED, the gain may be changed if that is desired. It should be noted that the angle between lens 518 and 520 is rather small so that the area between points 514 and 516 on surface 510 is smaller than was the case for the emitters of FIG. 1.

A first radiation responsive detector 540 is shown viewing an area of object 510 over a fairly wide angle shown by dashed lines 542 and 544. The viewing angle is chosen so that it will include the entire area between points 514 and 516 that are illuminated by the LED 512. A second radiation responsive detector 550 is shown viewing an area of object 510 over another fairly large angle shown by dashed lines 552 and 554 so as to include the entire area between points 514 and 516 illuminated by LED 512. Thus, both detectors 540 and 550 receive energy radiated from LED 512 and reflected back from the area between points 514 and 516 on the object 510. It is noted that detector 550 is located a distance L closer to the object 510 than is detector 540 for purposes to be explained hereinafter. As in all of the figures, the distance L may be actual displacement or may be an optical distance created by appropriate optics in the radiation path.

The output of detector 540 is shown by an arrow 560 and the output of detector 550 is shown by an arrow 562. These outputs vary with the amount of radiation received by the detectors 540 and 550 respectively. More particularly, the AC output of detector 540 will vary with the flux $F_1$ received by detector 540 in accordance with the equation:

$$F_1 = \frac{A}{R^2} \left[ \frac{EP \, a \sin wt}{\pi} \right] \quad (17)$$

where A is the illuminated area between points 514 and 516, E is the illumination incident upon the object 510, P is the reflectivity of the surface and a is the area of the detector 540. In similar fashion, the AC output at 562 varies with the flux $F_2$ in accordance with the equation:

$$F_2 = \frac{A}{(R+L)^2} \left[ \frac{EP \, a \sin wt}{\pi} \right] \quad (18)$$

It will be seen that by taking the ratio $F_1/F_2$ all of the factors except R and L cancel out as is seen by the equation:

$$F_1/F_2 = \frac{(R+L)^2}{R^2} \quad (19)$$

Of course L is constant so that the ratio of the two fluxes varies in a non-linear fashion with the distance R to the remote object.

The ratio can be obtained in any of a variety of ways, but in FIG. 10 it is shown by utilizing a phase shifter shown as box 570 connected to receive the output 562 of detector 550. Phase shifter 570 operates to change the phase of the signal on output 562 by a fairly large amount, for example, 170 degrees, and produces a phase shifted output on a connection shown as arrow 572 connected to a summing network shown as box 574. The output 560 from detector 540 is also connected to summing circuit 574 and summing circuit 574 operates to sum the two outputs 560 and 572 to produce a resultant output on a connection shown as arrow 578 connected to a phase detector 580 which, like was the case in connection with FIG. 1, detects the phase of the summed signal. The phase of this signal will be indicative of the distance to the remote object by the same analysis as was used in connection with FIG. 1. More particularly, if K is equal to $AEPa/\pi$, then from equation 18:

$$F_1 = \frac{K}{R^2} \sin(wt + \phi) \quad (20)$$

Where $\phi$ is the phase shift introduced by phase shifter 570 and:

$$F_2 = \frac{K}{(R + L)^2} \sin wt \quad (21)$$

Solving for the phase of $F_1+F_2$ gives:

$$\text{Phase } (F_1 + F_2) = \tan^{-1}\left[\frac{\sin \phi}{\frac{R^2}{(R + L)} 2 + \cos \phi}\right] \quad (22)$$

and as can be seen, the resultant phase varies in a non-linear fashion. The form of equation 22 differs from the form of equation 8 due to the phase difference being applied to the rearmost emitter 426 in FIG. 9 and the foremost detector 550 in FIG. 10.

The output of phase detector 580 representative of the phase given by equation 22 is presented by a connection shown as arrow 582 to a microprocessor shown as box 584 having an output shown as arrow 590. As explained in connection with FIG. 1, the microprocessor 584 can operate to linearize the otherwise non-linear signal so that the output on line 590 will be a function of the distance R in the same manner as it was in connection with FIG. 1. The output from the summing circuit 574 can, if desired, be used as an automatic gain control signal shown by an arrow 592 to control the drive circuitry 530 and thus control the intensity of the output from LED 512 to increase it when it is too dim or to decrease it when it is too bright. Since only one LED is used, this is possible where that was not the case in connection with FIG. 1. When G is used to express the relative gain, then equation 20 above becomes:

$$\text{Phase } (F_1 + F_2) = \tan^{-1}\left[\frac{\sin \phi}{\frac{GR^2}{(R + L)} 2 + \cos \phi}\right] \quad (23)$$

One advantage in using FIG. 10 over that of FIG. 1 is that it has been found that the output of the LEDs in FIG. 1 have to be very constant in order for the system to work accurately. This may be difficult since LEDs are known to be very temperature sensitive and they may not individual track well with changes in temperature for different LEDs. In the present case, however, with only one LED there is no problem with the difference between the LEDs and the illumination from LED 512 can change with temperature without affecting the accuracy of the system. It should be realized that the embodiment shown in FIG. 10 can also be utilized in connection with the embodiment shown in FIGS. 4, 6, 7, and 9 just as readily as was the case in connection with FIG. 1.

As mentioned above, the distance L in the FIGURES may be an actual distance or an optical distance produced by correctly choosing optical parameters in the path of the radiation to the detectors. FIG. 11 shows an optical arrangement embodying this concept. In FIG. 11, a radiation emitting source such as L.E.D. 610 is shown receiving an input at arrow 612 and producing radiation along lines such as 614 and 615 to a first lens 617 which operates to direct the energy along paths such as 619 and 620 to a remote surface 622, so as to form a spot of radiation between points such as 624 and 625 thereon. As with the other FIGURES, surface 622 is preferably partly diffuse so that the optics of the system does not have to employ means for eliminating spectral reflections as was done in FIG. 6.

A first detector 630 is shown receiving energy along paths such as dashed lines 632 and 633 from a second lens 635 which receives energy from the surface 622 between points such as 637 and 638 along dashed lines such as 640 and 641. As with FIG. 10, detector 630 therefore "sees" the entire spot between point 624 and 625 on surface 622. Detector 630 is shown in FIG. 1 as being located at a distance S1 back of lens 635 which, happens to be, in this case, the focal distance F1 also. Because of this, the detector 630 is effectively seeing the entire exit pupil of lens 635 or, in other words, the virtual image of detector 630 fills the back of lens 635. The output from detector 630 is shown by arrow 643.

A second detector 650 is shown located a distance S2 behind a third lens 652 which is shown in FIG. 1 as transmitting radiation along lines such as shown as dash lines 654 and 655. The detector 650 is mounted in front of the focal point 657 of lens 652. The virtual image of detector 650 is shown as dash-line box 660 a distance S2' back of lens 652 and the virtual image is, of course, substantially larger than the detector 650 itself.

Lens 652 receives radiation from surface 622 along paths such as shown as dash lines 663 and 664 from points 637 and 638 on surface 622 and thus, as with FIG. 10 "sees" the energy from spot 624–625. The amount of energy received by detector 650 is, however, less than it would receive had the focal length F2 of lens 652 been the same as the distance S2 since not all of the radiation from the lens 652 strikes the detector 650. More particularly, the amount of radiation received by detector 650 is the same as that that would be received by the virtual image detector 660 located a distance S2' back of lens 652. The output of detector 650 is shown as an arrow 668.

The distance L in FIG. 11 is shown as the distance between the virtual images of detectors D1 (which fill lens 635) and D2 (at positions shown by dash lines 660) and is thus much larger than that shown in the previous FIGURES even though the actual physical distance from D1 and D2 to the remote surface 622 is substantially the same. Thus, it is seen that by properly choosing the focal lengths of lenses 635 and 652, the distance L can be made to be any desired value without actually changing the physical position of the detectors 630 and 650.

It should be noted that FIG. 11 has been shown like FIG. 10 employing one light emitter and two detectors, but it should be understood that the lens arrangements of FIG. 11 could be also be employed with the two emitters and detector arrangement of the other FIGURES. Furthermore, the outputs 643 and 670 of detectors 630 and 650 may be conveniently connected into a circuit such as shown in FIG. 10 as arrows 560 and 562 respectively. Likewise, the input to LED 610 could be conveniently that shown by arrow 532 in FIG. 10.

Thus, by connecting the apparatus of FIG. 11 into the circuitry of FIG. 10, a similar output can be obtained.

An alternate signal processing circuit is shown in my co-pending application, Ser. No. 926,756, filed Nov. 4, 1986, and assigned to the assignee of the present invention. In that co-pending application, a light emitting source is pulsed for a short period of time by a drive circuit which may be a one-shot multivibrator, and the outputs of the two detectors reach a peak value of magnitude which depends upon the difference in their distance from the remote surface. These outputs are presented to sample-and-hold circuits which, at a desired time, are compared to produce an indication of that peak value difference which is shown therein to be a function of the distance to the remote surface. More particularly, the outputs of the sample-and-hold circuits are fed to, in one case, decay networks which allow the peak voltages to decay to a common point and the time required to do so is shown to be a function of the difference in peak values and thus by measuring that time with a comparator the distance to the remote surface can be obtained. The circuits of FIGS. 10 and 11 in the present application can be connected in such a circuit by connecting input 612 and outputs 643 and 670 of the present invention to input 52 and outputs 54 and 56 of my co-pending application respectively. Since such a circuit is less costly and simpler to produce, it is, preferable to do so.

FIGS. 12 through 17 show several different embodiments of a detector arrangement which may be employed in the present invention, particularly in those embodiments such as FIG. 11 that utilize lenses. Referring to FIG. 12, a plurality of lenses are shown front view in a first configuration. A first lens 670, labelled "E" is shown in the center and represents the lens that is used to transmit radiation. It is shown in FIG. 13 a distance S3 in front of the radiation transmitter shown in FIG. 13 by reference numeral 672. In FIGS. 12 and 13, instead of having two single detectors receiving energy reflected from the remote surface, the single detectors are replaced by three detectors connected in parallel. Using three detectors operates to increase the amount of radiation that can be received from the remote surface so as to improve the accuracy of the system. Accordingly, in FIG. 12, three lenses identified by reference numeral 675 and containing the designation D1 therein, are located equally spaced around the central lens 670. In FIG. 13, these three lenses have been shown as a single lens 675 for simplicity, but it should be understood that there are three lenses which are each placed a distance S1 in front of three separate detectors which, in FIG. 13, are shown as a single detector labelled by reference numeral 677. The output of the detectors identified as 677 is shown by an arrow 679 so as to provide signals for a circuit such as shown in FIG. 10 or, preferably, the circuit of the above-mentioned co-pending application, Ser. No. 926,756.

A second triad of detectors is also employed and accordingly, in FIG. 12, three more lenses identified by reference numeral 681 are shown each containing the designator D2 therein. In FIG. 13, these three lenses are shown as a single lens, but it should be understood that all three lenses will be placed in front of three detectors shown in FIG. 13 as a single detector identified by reference numeral 683 a distance S2 in front thereof. In FIG. 13, as in FIG. 11, the focal distance for lens 675 is the same as distance S1 and accordingly the virtual image of detector 677 will fill lens 675. The focal length of lens 681 is greater than the distance S2 and accordingly the virtual image for detector 683 will be shown by dash line 685 a distance S2' in back of lens 681. As explained in connection with FIG. 11, the output of detector D2 will be less than it would be had the focal length of lens 681 been the same as S2 and this output is shown as arrow 687. As with FIG. 11, the distance L is the distance between the virtual images of detectors 677 and 683 and is thus fairly large even though the difference between S2 and S1 is fairly small.

The input 673 of LED 672 and the outputs 679 and 687 of detectors 677 and 683 may, as with FIG. 11, be connected to circuitry such as shown in FIG. 10 or in the above-mentioned co-pending application Ser. No. 926,756.

Some actual values utilized in connection with FIGS. 12 and 13 are as follows: Lens 670 has a 12 millimeter diameter and a 20 millimeter effective focal length. Emitter 672 has a 1.3 millimeter diameter and the distance S3 is 20.4 millimeters. Accordingly, the angle subtended by the emitter 672 is 0.064 radians (1.3 divided by 20.4). Lenses 675 all have a 10 millimeter diameter and a 15 millimeter effective focal length. The detectors 677 all have a 2.5 millimeter diameter and the distance S1 is 15 millimeters. Accordingly, the angle subtended by the detector 677 is 0.167 radians (2.5 divided by 15). The lenses 681 all have a 20 millimeter diameter and a 40 millimeter effective focal length. The detector 683 has a 1 millimeter diameter and the distance S2 is 30 millimeters. Under these conditions, the virtual image of detector 683 at positions shown by dash lines 685 is 120 millimeters and this virtual image has a diameter of 4 millimeters (120 divided by 30×1). Accordingly, the angle of view of the virtual image of detector 683 is 0.13 radians (20—4 divided by 120).

Figure 14:
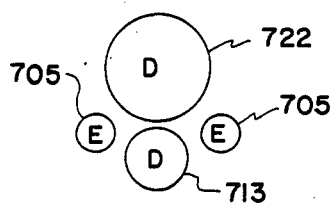
FIG. 14 shows an alternate detector arrangement.
Figure 15:
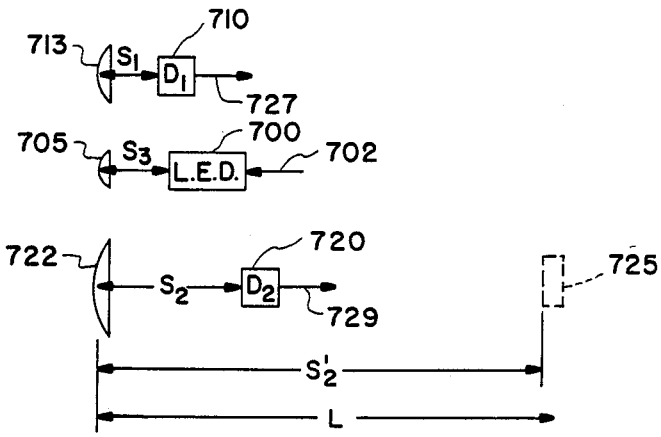
FIG. 15 shows a side view of FIG. 14.

FIGS. 14 and 15 show an alternate embodiment in which a pair of emitters is employed in combination with a single pair of detectors. More particularly, the LED 700 is actually a pair of LEDs connected in series and shown receiving an input along a path such as shown by arrow 702. Both emitters are located at distance S3 behind a lens 705 which is shown in FIG. 14 to be a pair of lenses. Thus, energy is transmitted from the energy source as represented by LED 700 through the lenses 705 to the remote surface so as to form a spot of energy thereon of greater intensity than could be obtained with one emitter-lens combination.

A first detector 710, identified as detector D1 is shown located a distance S1 behind a lens 713. As before, the focal length of lens 713 is the same as distance S1 and accordingly the virtual image of detector 710 will fill the lens 713.

A second detector 720 is shown located behind a larger lens 722 by a distance S2. The focal length of lens 722 is greater than the distance S2 and accordingly the virtual image of detector D2 will be in a position shown by dash lines 725 located a distance S2' behind lens 722. The distance L is, again, the distance between the virtual images of detectors 710 and 720. The output of detector 710 is shown by arrow 727 and the output of detector 720 is shown by arrow 729. As with FIGS. 11 and 13, these outputs and the input 702 may be connected into circuits such as shown in FIG. 10 or in the above-mentioned co-pending application, Ser. No. 926,756.

The arrangement of FIGS. 14 and 15 creates a greater amount of light on the remote surface which is good for better resolution but will have somewhat less accuracy than that of FIGS. 12 and 13. Some actual measurements utilized in connection with FIG. 15 are as follows: lenses 705 have a 10 millimeter diameter and an effective focal length of 15 millimeters. The emitters 700 have a surface which is 1.3 millimeters in diameter and the distance S3 is 15.22 millimeters. Accordingly, the angle subtended by the emitter 700 is 0.085 radians (1.3 divided by 15.22). Lens 731 has a 15 millimeter diameter and an effective focal length of 18 millimeters. Detector D1 has a surface of 2.5 millimeters diameter and the distance S1 is 18 millimeters. Accordingly, the angle subtended by detector D1 is 0.139 radians (2.5 divided by 18). Lens 722 has a 25 millimeter diameter and a 50 millimeter effective focal length. Detector D2 is located a distance 35 millimeters in back of lens 722 and accordingly the virtual image of detector D2 is 117 millimeters in back of lens 722. The effective diameter of the detector D2 thus becomes 8.3 millimeters (117 divided by 35×2.5), and the angle of view thereby is 0.142 radians (25−8.36 divided by 117).

Figure 16:
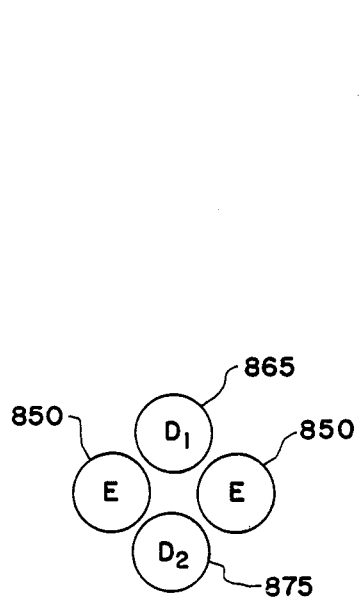
FIG. 16 shows another alternate detector arrangement.
Figure 17:
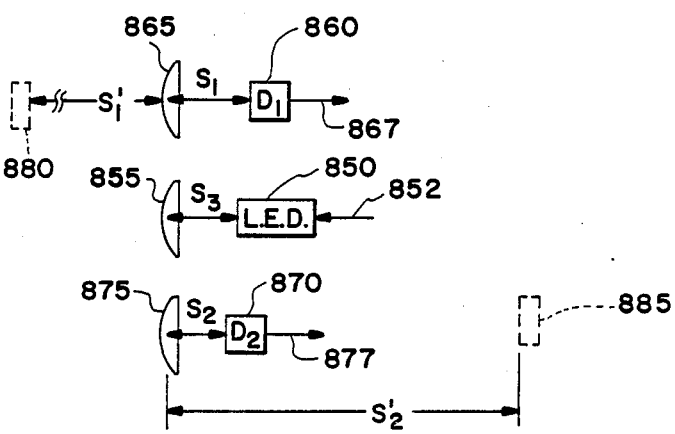
FIG. 17 shows a side view of FIG. 16.

FIGS. 16 and 17 show a third embodiment of the detector arrangement of the present invention in which two series connected emitters are again employed and a single pair of detectors as was the case in connection with FIG. 15, but in this case the virtual image of one of the detectors is located in front of its associated lens. More particularly, in FIG. 17, a pair of emitters such as shown by reference numeral 850 are located a distance S3 behind a pair of lenses shown as lenses 855, similar to the case in connection with FIGS. 14 and 15. A first detector D1, identified by reference numeral 860 is shown located a distance S1 behind a lens 865. An output from detector 860 is shown by arrow 867. A second detector identified by reference numeral 870 is shown located a distance S2 behind a lens 875 and has an output shown by arrow 877. In this embodiment, all four of the lenses are identical in size and effective focal length. They are shown in FIG. 16 as being arranged roughly in a diamond or square shape. In the present embodiment, the focal length of lens 865 is not the same as distance S1 but is, in fact, slightly less than the distance S1 and because of this the image of detector 860 will now be shown in front of lens 865 by a dashed line box 880, several times larger than detector 860 and located in front of lens 865 by a distance S1'.

Lens 875 is arranged similarly to the lenses of FIGS. 15 or 13 in that the focal length thereof is greater than the distance S2 and accordingly the virtual image of detector 870 is shown as dash line 885 located a distance S2' in back of lens 875. As with the other FIGURES, the outputs 867 and 877 and the emitter input 852 may be connected into circuits such as shown in FIG. 10 or, preferably, to the circuit such as is shown in the above-mentioned co-pending application, Ser. No. 926,756.

Some dimensions used in connection with FIGS. 16 and 17 are as follows: Lenses 855 are 20 millimeters in diameter and 18 millimeters in effective focal length. The emitters 850 have a 1.3 millimeter diameter and the distance S3 is 18.33 millimeters. As such, the angle subtended by the emitters 850 is 0.071 radians (1.3 divided by 18.33). Lens 865 is 20 millimeters in diameter and has an 18 millimeter effective focal length. The detector 860 is 1 millimeter in diameter and the distance S1 is 22 millimeters. Accordingly, the image represented by dash line 880 is in front of lens 865 by a distance S1' equal to 99 millimeters. The size of this image is 4.5 millimeters (99 divided by 22×1) and the angle of view of the image detector 880 will be 0.157 radians (20−4.5 divided by 99). Lens 875 is 20 millimeters in diameter and has an effective focal length of 18 millimeters. Detector 870 is 1 millimeter in diameter and distance S2 equal to 15 millimeters. Accordingly, the virtual image represented by dash line 885 is located 90 millimeters in back of lens 875 and has a size which is 6 millimeters (90 divided by 15×1). The angle of view of the image detector 885 is 0.156 radians (20−6 divided by 90).

The arrangement of FIGS. 16 and 17 is an excellent approach for long range operation because the size of the emitter lenses is quite large and the focal length is fairly small. Such lenses, however, are difficult to create and are fairly expensive.

It is thus seen that I have provided a device for determining the distance to a surface which is both economical, uncomplicated, inexpensive, and accurate. Many obvious modifications will occur to those skilled in the art. As for example, the various phase angles used may be altered from those shown in the present invention, different sources of energy than LEDs and infrared wavelengths may be utilized and other ways of detecting phase or measuring the ratio of $F_1$ and $F_2$ may be employed. If, for example, the energy sources 12 and 18 were modulated at different frequencies, then frequency responsive apparatus could be employed to separate the two fluxes and take their ratio. It should also be understood that the use of microprocessors is arbitrary and depends on the use involved. I therefore intend not to be limited by the specific structures used to explain the preferred embodiments but rather intend to be limited only by the following claims.

I claim:

1. Apparatus for producing an output indicative of the distance to a remote surface, comprising:
   first beam producing means arranged to project a first beam of optical energy, having a first phase, to the surface;
   second beam producing means arranged to project a second beam of optical energy, having a second phase, to the surface, the second beam producing means positioned a predetermined distance more remote from the surface than the first beam producing means;
   energy responsive means positioned to receive energy reflected from the surface and to produce a resultant signal representative of the vector sum of the reflections of the first and second beams;
   phase sensing means connected to receive the resultant signal and to produce therefrom an output signal indicative of the phase of the resultant signal as an indication of the distance to the remote surface;
   oscillator means connected to drive the first and second beam producing means at a common frequency and connected to the phase sensing means to supply a reference signal thereto; and
   phase shifting means connected between the oscillator means and one of the first and second beam producing means to shift the phase of the drive thereto.

2. Apparatus according to claim 1 wherein the phase shift produced by the phase shifting means is greater than 90 degrees.

3. Apparatus according to claim 1 further including processing means connected to receive the output signal and to produce, in accordance with a predetermined function thereof, a control signal to operate a control device.

4. Apparatus according to claim 3 further including oscillator means connected to drive the first and second beam producing means at a common frequency and connected to the phase sensing means to supply a reference signal thereto and including phase shifting means connected between the oscillator means and one of the first and second beam producing means to shift the phase of the drive thereto.

5. Apparatus according to claim 1 wherein the first and second beam producing means are light emitting diodes and the energy responsive means is a photodiode.

6. Apparatus according to claim 5 wherein the light emitting diodes operate in the infrared range.

7. Apparatus according to claim 1 further including polarizing means positioned between the first and second beam producing means and the surface, and an analyzer positioned between the surface and the energy responsive means, polarized 90 degrees from the polarizing means, to minimize specular reflections from reaching the energy responsive means.

8. Apparatus according to claim 1 further including third beam producing means arranged to project a third beam of optical energy, having a third phase, to the surface and the resultant signal from the energy responsive means is representative of the vector sum of the reflections of the first, second and third beams.

9. Apparatus according to claim 8 wherein the second phase is 180 degrees from the first phase and the third phase is 90 degrees from the first phase.

10. Apparatus according to claim 1 wherein the first beam producing means includes a first fiber optic element, the second beam producing means includes a second fiber optic element and the energy responsive means includes a third fiber optic element.

11. Apparatus according to claim 10 wherein the first, second, and third fiber optic elements are arranged concentrically.

12. Apparatus according to claim 10 wherein the third fiber optic element has a lower numerical aperature than the first and second fiber optic elements.

13. Apparatus according to claim 1 wherein the first phase is opposite the second phase and the resultant signal is of the first phase when the remote surface is closer than a predetermined distance and is of the second phase when the remote surface is nearer than the predetermined distance.

14. Apparatus according to claim 13 wherein a small signal is presented to the energy responsive means to provide a signal of the first phase when no reflected energy is received from the remote surface.

15. Apparatus according to claim 1 wherein the predetermined distance is a physical distance.

16. Apparatus according to claim 1 wherein the predetermined distance is an optical distance.

17. Apparatus responsive to the distance to a surface comprising:
first and second optical energy emitting sources, one of which is positioned a predetermined distance more remote from the surface than the other;
driver means including oscillator means connected to the first and second sources for driving the first of the sources so that energy of a first frequency and of a first phase illuminates a first portion of the surface and driving the second of the sources so that energy of the first frequency and of a second phase illuminates the first portion of the surface;
energy responsive means positioned to receive energy reflected from the first portion of the surface and to produce a resultant signal representative of the vector resultant of the reflected energy of the first and second phase;
phase discriminating means connected to receive the resultant signal and to produce therefrom an output which varies with the phase of the vector resultant and thus with the distance to the surface; and
phase shifting means connected between the oscillator means and one of first and second sources to shift the phase of the drive signal thereto.

18. Apparatus according to claim 17 wherein the phase shift produced by the phase shifting means is greater than 90 degrees.

19. Apparatus according to claim 17 further including processing means connected to receive the output of the phase discriminating means and to produce, in accordance with a function thereof, a control output for use by utilization apparatus.

20. Apparatus according to claim 19 wherein the driver means includes oscillator means to supply drive signals to the first and second sources at a common frequency and to supply a reference signal to the phase discriminating means.

21. Apparatus according to claim 20 further including phase shifting means connected between the oscillator means and one of the first and second sources to shift the phase of the drive signal thertо.

22. Apparatus according to claim 17 wherein the first and second sources are light emitting diodes and the energy responsive means is a photodiode.

23. Apparatus according to claim 22 wherein the light emitting diode operate in the infrared range.

24. Apparatus according to claim 17 wherein the surface is at least partly specular and further including polarizing means to polarize the energy illuminating the first portion of the surface and including analyzer means polarized 90 degrees from the polarizing means to block the polarized energy from reaching the energy responsive means.

25. Apparatus according to claim 17 further including a third optical energy emitting source substantially at the same distance from the surface as one of the first and second sources, the driver means driving the third source so that energy of the first frequency and of a third phase illuminates the first portion of the surface.

26. Apparatus according to claim 25 wherein the second phase is 180 degrees from the first phase and the third phase is 90 degrees from the first phase.

27. Apparatus according to claim 2 wherein the predetermined distance is a physical distance.

28. Apparatus according to claim 17 wherein the predetermined distance is an optical distance.

29. Proximity sensing apparatus for use with a remote surface comprising:
first energy producing means for projecting energy of a first phase to at least a first portion of the surface;
second energy producing means for projecting energy of a second phase to at least the first portion of the surface, the second energy producing means positioned a predetermined distance more remote from the surface than the first energy producing means;
energy responsive means for receiving energy reflected from at least a portion of the first portion of the surface to produce a signal representative of the intensity of the energy of the first and second phase received thereby; and energy responsive means connected to receive the signal and to produce therefrom an output which varies with the ratio of the energy of the first and second phases as an indication of the proximity of the remote surface.

30. Apparatus responsive to the distance to a remote object comprising:

radiation means having a first part for transmitting radiation to at least a portion of a remote object and a second part for receiving radiation reflected from the portion, the second part producing an output which varies with the radiation received, one of the first and second parts having first and second subparts with the first subpart arranged a predetermined distance closer to the object than the second subpart, the first and second subparts causing the output to contain first and second components, the first component varying with the distance to the object and the second component varying with the sum of the distance to the object and the predetermined distance; and processing means connected to receive the output and to produce a resulting signal which varies with the ratio of the first and second components as an indication of the distance to the remote object.

31. Apparatus according to claim 30 wherein the first and second components also vary with factors related to the size of the portion, the reflectivity of the object and intensity of the radiation which factors cancel when ratio of the first and second components is taken.

32. Apparatus according to claim 30 wherein the first and second subparts are first and second radiation transmitters and the radiation transmitted by the first transmitter is phase shifted with respect to the radiation transmitted by the second transmitter.

33. Apparatus according to claim 32 wherein the processing means includes a phase detector.

34. Apparatus according to claim 30 wherein the first and second subparts are first and second signal producing radiation detectors and the first and second components are the signals from the first and second radiation detectors respectively.

35. Apparatus according to claim 34 wherein the first component is phase shifted with respect to the second component and the first and second components are summed to produce the output.

36. Apparatus according to claim 35 further including a phase detector connected to receive the output and the resulting signal varies with the phase thereof.

37. Apparatus for determining the distance to a remote surface comprising:

radiation transmitting means for illuminating a portion of the surface with radiation of a first frequency;

first detector means mounted a first distance from the remote surface receiving radiation from the portion to produce a first output of the first frequency and of magnitude which varies with the first distance;

second detector means mounted a second distance from the surface different than the first distance by a predetermined amount to provide a second output of the first frequency and of magnitude which varies with the second distance;

phase shift means connected to the first detector means to shift the phase of the first output by a predetermined amount; and signal processing means connected to receive the phase shifted first output and the second output and to produce a resultant output which varies with the ratio therebetween as an indication of the distance to the remote surface.

38. Apparatus according to claim 37 wherein the signal processing means includes summing means to produce a summed output of the phase shifted first output and the second output and a phase detector to receive the summed output to produce the resultant output.

39. Apparatus according to claim 37 further including microprocessing means connected to receive the resultant output to produce a linearized output.

40. Apparatus according to claim 37 further including gain control means connected to control the amount of radiation transmitted by the radiation transmitter means.

41. Apparatus for producing an output indicative of the distance to a remote surface, comprising:

first beam producing means arranged to project a first beam of optical energy, having a first phase, to a first area on the surface;

second beam producing means arranged to project a second beam of optical energy, having a second phase, to the first area on the surface, the second beam producing means positioned a predetermined distance more remote from the surface than the first beam producing means;

energy responsive means positioned to receive energy reflected only from the first area on the surface and to produce a resultant signal representative of the vector sum of the reflections of the first and second beams, variations in the phase of the resultant signal being indicative of variations in the distance to the remote surface; and phase sensing means connected to receive the resultant signal and to produce therefrom an output signal indicative of the phase of the resultant signal as an indication of the distance to the remote surface.

42. Apparatus responsive to the distance to a surface over a range comprising:

first and second optical energy emitting sources, one of which is positioned a predetermined distance more remote from the surface than the other;

driver means driving the first of the sources so that energy from a first frequency and of a first phase illuminates a first portion of the surface and driving the second of the sources so that energy of the first frequency and of a second phase illuminates the first portion of the surface;

energy responsive means positioned to receive energy reflected only from the first portion of the surface and to produce a resultant signal representative of the vector resultant of the reflected energy of the first and second phase, variations in the phase of the vector resultant being indicative of variations in the distance over substantially the entire range to the surface; and phase discriminating means connected to receive the resultant signal and to produce therefrom an output which varies with the phase of the vector resultant and thus with the distance to the surface.

43. Optical apparatus for use in a proximity sensing system having an energy emitting means to direct energy to a remote surface, first energy detecting means to receive energy reflected from the surface, and second energy detecting means to receive energy reflected from the surface, the first and second detecting means each receiving energy from that portion of the surface to which the energy emitting means operates to direct energy, the first detecting means including first lens means mounted in the path of energy reflected thereto so as to form an image of the first detecting means at a distance more remote from the surface than the second detecting means so that a comparison of the outputs of the first and second detecting means is indicative of the distance to the remote surface.

44. Apparatus according to claim 43 wherein the second detecting means includes second lens means mounted in the path of energy reflected thereto to form an image of the second detecting means at a distance closer to the surface than the virtual image of the first detecting means.

45. Apparatus according to claim 43 wherein the first detecting means includes at least two radiation detectors connected in parallel and the first lens means comprises at least two lenses of substantially the same optical characteristics, one lens mounted in the path of energy reflected to each radiation detector.

46. Apparatus according to claim 44 wherein the first and second detecting means each include at least two radiation detectors connected in parallel and the first and second lens means each comprise at least two lenses of substantially the same optical characteristics, one lens mounted in the path of energy reflected to each radiation detector.

47. Apparatus according to claim 46 wherein the energy emitting means is positioned at a central location and the lenses are spaced around the central location.

48. Apparatus according to claim 43 wherein the energy emitting means includes at least two energy emitters.

49. Apparatus according to claim 48 including a lens positioned between each energy emitter and the surface to direct the energy to the portion of the surface from which the detectors receive reflected energy.

50. Apparatus for use in a proximity sensing system comprising:
energy emitting means to direct energy to a first portion of a remote surface;
first detecting means to receive energy reflected from the first portion;
second detecting means to receive energy reflected from the first portion; and
first means for causing the second detecting means to be optically more remote from the surface than the first detecting means so that a comparison of the outputs of the first and second detecting means is indicative of the distance to the remote surface.

51. Apparatus according to claim 50 wherein the first means includes first lens means mounted in the path of reflected energy to the first detector to cause an image of the first detector which is more remote from the surface than the second detector.

52. Apparatus according to claim 51 wherein the first means further includes second lens means mounted in the path of the reflected energy to the second detector and having optical characteristics different from the first lens means so that the image of the second detector is optically less remote from the surface than the image of the first detector.

53. Apparatus according to claim 52 wherein the first detecting means comprises at least two radiation detectors connected in parallel.

54. Apparatus according to claim 53 wherein the second detecting means comprises at least two radiation detectors connected in parallel.

55. Apparatus according to claim 50 wherein the emitting means includes lens means mounted in the path of energy to the surface to direct the energy to the first portion.

56. Apparatus according to claim 50 wherein the energy emitting means includes at least two energy emitters connected in series.

57. Apparatus for producing an output indicative of the distance to a remote surface, comprising:
first beam producing means arranged to project a first beam of energy, having a first phase, to a first area on the surface;
second beam producing means arranged to project a second beam of energy, having a second phase, to the first area on the surface, the second beam producing means positioned a predetermined optical distance more remote from the surface than the first beam producing means;
energy responsive means positioned to receive energy reflected only from the first area on the surface and to produce a resultant signal representative of the ratio of the reflections of the first and second beams, variations in the distance to the remote surface causing the phase of the resultant signal to change; and
phase sensing means connected to the energy responsive means to produce an output signal which varies with the phase of the resultant signal and is thus indicative of the distance to the remote surface.

58. Apparatus for producing an output indicative of the distance to a remote surface, comprising:
beam producing means arranged to project a beam of energy to a first area on the surface;
first energy responsive means positioned to receive energy reflected from the entire first area to produce a first signal in accordance with the energy received therefrom;
second energy responsive means positioned to receive energy reflected from the entire first area to produce a second signal in accordance with the energy received therefrom, the second energy responsive means being positioned a predetermined optical distance more remote from the surface than the first energy responsive means; and
phase sensing means connected to the first and second energy responsive means to produce a resultant signal in accordance with the ratio of the first and second signals, changes in the distance to the remote surface causing changes in the ratio of the first and second signals to make the resultant signal indicative of the distance to the remote surface.

* * * * *